Oct. 19, 1948.                R. DOERR ET AL                2,451,928
                          BALL BEARING VALVE STEM
                             Filed July 9, 1945
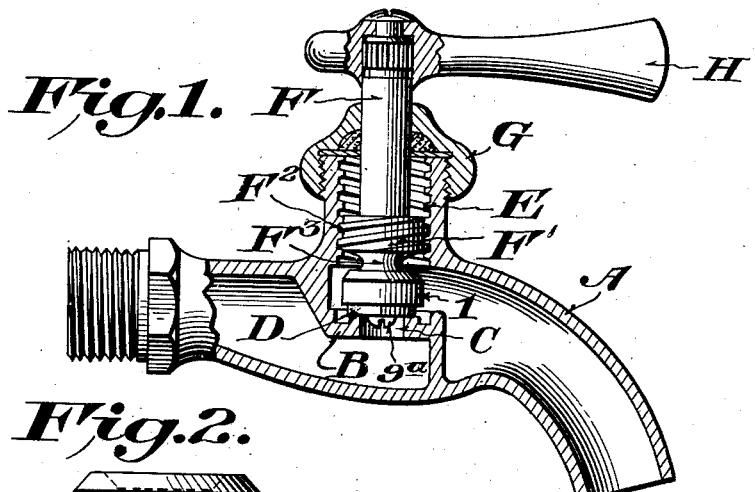
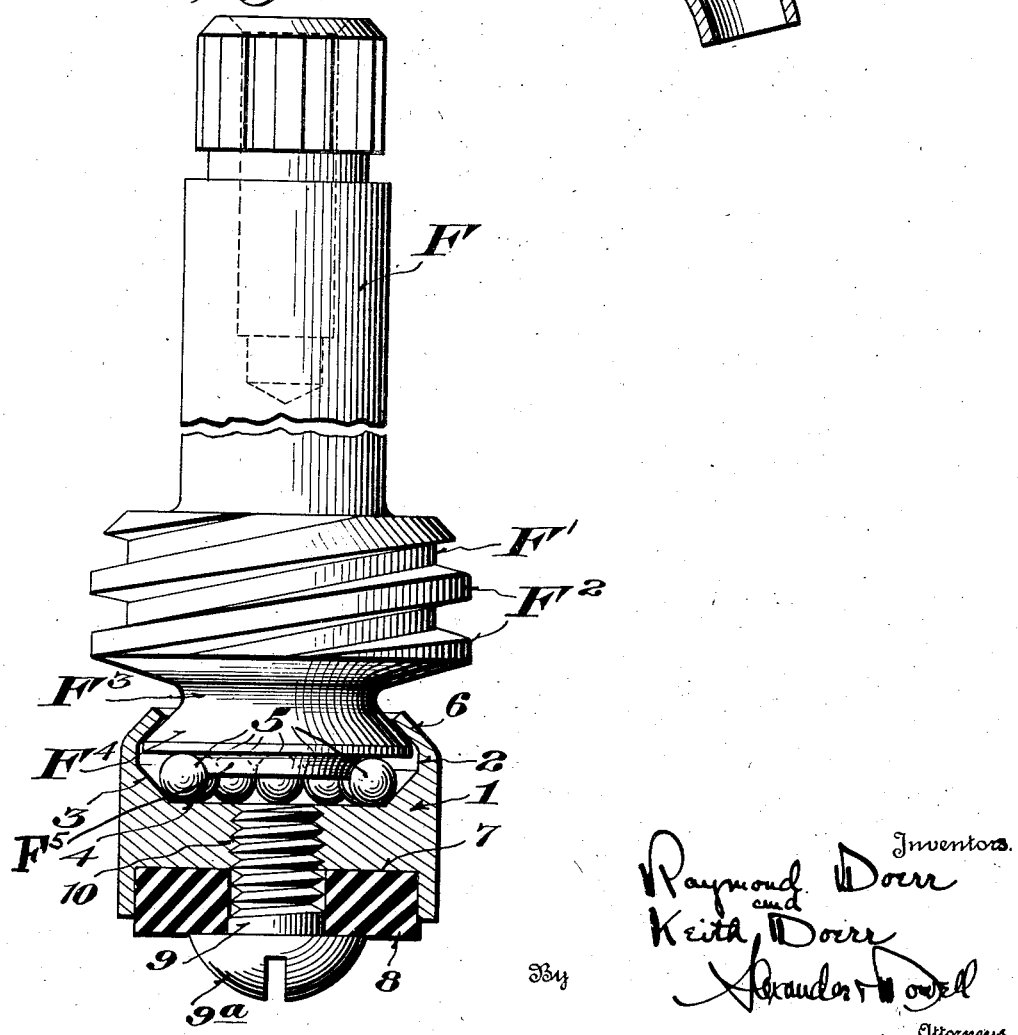

Patented Oct. 19, 1948

2,451,928

UNITED STATES PATENT OFFICE 2,451,928

BALL-BEARING VALVE STEM

Raymond Doerr and Keith Doerr, Battle Creek, Mich., assignors to H. B. Sherman Manufacturing Co., Battle Creek, Mich., a corporation of Michigan Application July 9, 1945, Serial No. 603,866

4 Claims. (Cl. 251—46)

This invention relates to faucets, bibs, valves or the like, and the principal object thereof is to provide a novel faucet, or the like, having a ball bearing washer assembly carried by the valve stem, which assembly may be economically manufactured and readily assembled, eliminating likelihood of separation of parts.

We will explain the invention with reference to the accompanying drawing, which illustrates one practical embodiment thereof to enable others to adopt and use the same, and will summarize in the claims the novel features of construction, and novel combination of parts, for which protection is desired.

In said drawings:

Figure 1 is a longitudinal section through a conventional faucet but provided with our novel ball bearing washer assembly cooperating with the valve seat;

Fig. 2 is an enlarged elevation, partly in section, showing our novel ball bearing washer assembly mounted on the valve stem, detached.

As shown, faucet A is of conventional type having a wall B provided with an opening C surrounded on its upper face with a valve seat D in the usual manner, the faucet having an internally threaded bore E above seat D and aligned with opening C into which the valve stem F is threaded, stem F having an enlarged head F' at its lower end externally threaded as at F2. The threads F2 on the enlarged head F' of stem F may be pitched either right-handed or left-handed as desired, according to the pitch of the internal threads of bore E of the faucet. Suitable packing G surrounds the outer portion of stem F above the bore, which stem carries the handle H, whereby when the handle is swung the valve stem F will rise or fall with respect to the valve seat D.

As shown more particularly in Fig. 2, the lower end of the stem F below head F' is contracted in diameter as at F3 same terminating in a truncated conical portion F4 for the purpose hereinafter described. The outer periphery of the lower face of the conical portion F4 is normal to the axis of the stem F, as shown, and is provided with a central depending curved machined surface F5 conforming with the curvature of the balls 5, said portions F4, F5 forming the upper ball race. Disposed below the conical portion F4 of the stem F is a seat washer retainer 1 of cylindrical shape and of somewhat larger diameter than that of the lower or larger end of the conical portion F4, said retainer 1 having a relatively deep circular recess 2 in its upper face terminating in a truncated conical contracted portion 3 at its lower end, said conical contracted portion terminating in a surface 4 normal to the axis of the retainer 1 upon which the annular series of balls 5 seat, said balls being interposed between the surface 4 and the lower surface of the conical portion F4 of stem F, and the conical contracted portion 3 serving to restrict the radial outward movement of said balls 5. The upper edges of the wall of the bore 2 are spun inwardly as at 6 after assembly to closely overlie the outer walls of the conical portion F4 while maintaining sufficient play between the parts to permit the retainer 1 to rotate freely on the conical portion F4 without binding. The spinning of the wall portion 6 is obviously performed after the balls 5 and the retainer 1 have been properly positioned with respect to the conical portion F4 of the stem. The machined surface F5 at the lower end of the stem F provides an axis for the ball race keeping the washer retainer unit in alignment and preventing unnecessary bearing of the spun or crimped edge 6 on the stem portion F4.

In the lower face of retainer 1 is a shallow circular recess 7 of relatively large diameter for the reception of a rubber or fiber washer 8 which latter is retained therein by the head 9a of a screw 9 threaded into a tapped bore 10 with retainer axially disposed with respect to the recess 7, the screw 9 preferably terminating below the ball race surface 4.

By the above construction the seat washer retainer 1 serves as the lower race for the balls 5 and also serves to carry directly the seat washer 8. When the wall of the retainer is spun as at 6 over the conical portion F4 with the balls 5 positioned between the parts, the parts will be securely locked together while permitting rotation of the retainer 1 carrying the washer 8 with respect to the valve stem F. The close fit between the spun wall 6 and the walls of the conical portion F4 of the stem will maintain the ball bearing assembly relatively free from dirt and sediment, and there will be little, if any, possibility of the retainer 1 becoming so loosened on the stem F so that the balls 5 might become lost from their position between the retainer and the lower end of valve stem F.

We do not limit our invention to the exact form shown in the drawing, for obviously changes may be made therein within the scope of the claims.

We claim:

1. In a faucet, valve, or the like, having a valve seat and having a valve stem rotatable and movable with respect to the valve seat; said valve stem having a conical portion at its lower end enlarging towards the seat; a cylindrical seat washer retainer below the stem having a relatively deep circular recess in its upper face; balls directly contacting the lower end of the stem and bottom of the recess; the upper edge portions of the walls of the recess surrounding and closely conforming with the conical portion of the stem, while permitting rotation of the retainer on the stem; and a washer carried by the said retainer.

2. In a faucet, valve, or the like, having a valve seat and having a valve stem rotatable and movable with respect to the valve seat; said valve stem having a conical portion at its lower end enlarging towards the seat; and terminating in a plane surface normal to the axis of the stem; a cylindrical seat washer retainer below the stem having a relatively deep circular recess in its upper face with a plane surface bottom disposed normal to the axis of the stem; series of balls disposed between the lower end of the stem and bottom of the recess; the upper edge portions of the walls of the recess surrounding and closely conforming with the conical portion of the stem, while permitting rotation of the retainer on the stem; and a washer carried by the said retainer.

3. In a faucet, valve, or the like, having a valve seat and having a valve stem rotatable and movable with respect to the valve seat; said valve stem having a conical portion at its lower end enlarging towards the seat and terminating in a plane surface normal to the axis of the stem; a cylindrical seat washer retainer below the stem having a relatively deep circular recess in its upper face terminating in a truncated contracted conical lower portion having a plane surface bottom disposed normal to the axis of the stem; an annular series of balls disposed between the lower end of the stem and bottom of the recess maintained against outward radial movement by the said truncated conical lower portion of the recess; the upper edge portions of the walls of the recess surrounding and closely conforming with the conical portion of the stem while permitting rotation of the retainer on the stem; and a washer mounted on the lower face of the said retainer.

4. In a faucet, valve, or the like, having a valve seat and having a valve stem rotatable and movable with respect to the valve seat; said valve stem having a conical portion in its lower end enlarging towards the seat and terminating in an under surface whose peripheral portion is normal to the axis of the stem and whose central portion is carried inwardly and downwardly; a cylindrical seat washer retainer below the stem having a relatively deep recess in its upper face terminating in a truncated contracted conical lower portion having a plane surface bottom disposed normal to the axis of the stem; an annular series of balls disposed between the lower end of the stem and bottom of the recess maintained against outward radial movement by said truncated conical lower portion of the recess, and against inward radial movement by said inwardly and downwardly curved central portion of the under surface of the stem, the upper edge portions of the walls of the recess surrounding and closely forming with the conical portion of the stem while permitting rotation of the retainer on the stem; and a washer mounted on the lower face of the said retainer.

RAYMOND DOERR.
KEITH DOERR.

REFERENCES CITED

The following references are of record in the file of this patent:

UNITED STATES PATENTS

| Number | Name | Date |
| --- | --- | --- |
| 2,192,452 | Ostlind | Mar. 5, 1940 |
| 2,281,689 | Hare | May 5, 1942 |